United States Patent
Foxx-Gruensteidl

(10) Patent No.: US 11,738,953 B2
(45) Date of Patent: Aug. 29, 2023

(54) TRANSPORT SYSTEM MONITORING DEVICE

(71) Applicant: UNITED STATES POSTAL SERVICE, Washington, DC (US)

(72) Inventor: Manfred Foxx-Gruensteidl, Amissville, VA (US)

(73) Assignee: UNITED STATES POSTAL SERVICE, Washington, DC (US)

(*) Notice: Subject to any disclaimer, the term of this patent is extended or adjusted under 35 U.S.C. 154(b) by 0 days.

(21) Appl. No.: 17/082,188

(22) Filed: Oct. 28, 2020

(65) Prior Publication Data
US 2021/0130104 A1    May 6, 2021

Related U.S. Application Data

(60) Provisional application No. 62/928,759, filed on Oct. 31, 2019.

(51) Int. Cl.
*B65G 43/02* (2006.01)
*B65G 45/10* (2006.01)

(52) U.S. Cl.
CPC ............ *B65G 43/02* (2013.01); *B65G 45/10* (2013.01); *B65G 2203/0266* (2013.01); *B65G 2203/041* (2013.01); *B65G 2203/042* (2013.01)

(58) Field of Classification Search
None
See application file for complete search history.

(56) References Cited

U.S. PATENT DOCUMENTS

| | | | | |
|---|---|---|---|---|
| 7,673,739 B2* | 3/2010 | Freeman | ................ | B65G 43/02 198/810.01 |
| 7,740,130 B2* | 6/2010 | Wallace | ................ | B65G 43/02 198/810.02 |
| 7,894,934 B2* | 2/2011 | Wallace | ................ | B65G 43/00 198/341.01 |
| 9,315,334 B2* | 4/2016 | Mellars | ................ | B65G 43/00 |
| 10,488,282 B2* | 11/2019 | Guru | ................ | H02P 6/10 |
| 11,035,102 B2* | 6/2021 | Espejo Pina | ............ | G01V 3/10 |
| 11,208,269 B2* | 12/2021 | Onishi | ................ | B65G 17/38 |
| 2020/0346874 A1* | 11/2020 | Onishi | ................ | B65G 17/38 |

\* cited by examiner

*Primary Examiner* — Kavel Singh
(74) *Attorney, Agent, or Firm* — MH2 Technology Law Group, LLP

(57) ABSTRACT

A monitoring device can include one or more sensors, and a processor, operably connected to the one or more sensors, configured to execute computer-readable instructions that cause the processor to perform operations including detecting sensor data from the one or more sensors. The sensor data can be collected as the monitoring device is in transit in a transport system for delivery items. The operations can also include detecting a malfunctioning component in the transport system based on the sensor data, and transmitting a maintenance indicator to a control system of the transport system, wherein the maintenance indicator identifies the malfunctioning component.

20 Claims, 5 Drawing Sheets

TRANSPORT SYSTEM MONITORING DEVICE

CROSS-REFERENCE TO RELATED APPLICATIONS

This application claims the benefit of and priority to U.S. Provisional Application No. 62/928,759, filed on 31 Oct. 2019, which is hereby incorporated by reference in its entirety.

BACKGROUND

Various agencies and companies provide parcel delivery services, such as the U.S. Postal Service, the Federal Express corporation (FedEx™), and the United Parcel Service corporation (UPS™). Generally, delivery items or goods can be sorted and prepared for delivery within a processing center. In some systems, the delivery items or goods can be placed in containers and transported throughout the processing center using any suitable transport system, such as a system of conveyor belts, among others. Some transport systems can include various integrated components such as lift devices, decline conveyor devices, push devices, and the like. Additionally, the transport systems can include various types of belt conveyors with any number of idler pulleys and pulleys connected to power transmission belts.

Due to the various components of the transport system, the transport system can experience frequent maintenance issues and scheduling maintenance can be problematic. For example, some transport systems can be halted for maintenance operations at fixed periods of time. During the maintenance operations, various components of the transport system can be manually inspected and repaired.

Accordingly, there is a desire for systems and devices that can accurately monitor the performance of components of a transport system and indicate when maintenance is necessary for the components. Techniques described herein include monitoring devices coupled to sensors that can monitor and detect maintenance issues in a transport system.

SUMMARY

Various aspects of the present disclosure describe a monitoring device for collecting sensor data corresponding to a transport system. In some embodiments, a monitoring device can include one or more sensors, and a processor that is operably connected to the one or more sensors. The processor can be configured to execute computer-readable instructions that cause the processor to perform operations including detecting or obtaining sensor data from the one or more sensors. In some examples, the sensor data can be collected as the monitoring device is in transit in a transport system for delivery items. In some embodiments, the operations can include detecting a malfunctioning component in the transport system based on the sensor data, and transmitting a maintenance indicator to a control system of the transport system, wherein the maintenance indicator identifies the malfunctioning component.

In some embodiments, the monitoring device is attached to a container or integrated into the container that is transported by the transport system. In some examples, the one or more sensors comprise at least one of an accelerometer, a gyroscope, a humidity sensor, a temperature sensor, or a location sensor. In some embodiments, the monitoring device comprises an actuator and a camera, and the operations comprise activating the actuator to remove debris from the camera.

In some examples, detecting the malfunctioning component in the transport system based on the sensor data comprises detecting a malfunction in one or more of: a lift device, a decline conveyor device, or a push device of the transport system. In some embodiments, the control system comprises a second processor that is configured to perform operations including obtaining a predetermined range of sensor data corresponding to expected operating conditions for each of the one or more sensors. The operations can also include modifying the predetermined range of sensor data corresponding to the expected operating conditions based on the maintenance indicator, and detecting subsequent malfunctioning components based on the modified predetermined range of sensor data. In some embodiments, the second processor is configured to perform operations comprising detecting or obtaining a plurality of maintenance indicators from two or more transport systems, and aggregating the plurality of maintenance indicators from the two or more transport systems.

In some examples, aggregating the plurality of maintenance indicators comprises aggregating the plurality of maintenance indicators based on a shared type of the one or more sensors corresponding to the maintenance indicators. In some embodiments, the second processor is configured to perform operations comprising prioritizing repairs to the subsequent malfunctioning components based on the modified predetermined range of sensor data. In some examples, detecting the malfunctioning component in the transport system based on the sensor data comprises detecting a malfunction in one or more of: a conveyor belt, an idler pulley, a transmission pulley. In some embodiments, the one or more sensors include a camera, and detecting the malfunctioning component in the transport system based on the sensor data comprises identifying the malfunctioning component using machine learning techniques applied to at least one image of the malfunctioning component. In some embodiments, the maintenance indicator comprises a time to perform maintenance on the malfunctioning component.

In various implementations, a computer-implemented method for distributing delivery items can include detecting or obtaining sensor data from one or more sensors, the sensor data collected as a monitoring device is in transit in a transport system for delivery items. The method can also include detecting a malfunctioning component in the transport system based on the sensor data, and transmitting a maintenance indicator to a control system of the transport system, wherein the maintenance indicator identifies the malfunctioning component.

In yet another embodiment, a non-transitory computer-readable media for processing sensor data for a transport system can include instructions that in response to execution by a processor cause the processor to perform operations comprising detecting or obtaining sensor data from one or more sensors, the sensor data collected as the monitoring device is in transit in a transport system for delivery items. The operations can also include detecting a malfunctioning component in the transport system based on the sensor data, and transmitting a maintenance indicator to a control system of the transport system, the maintenance indicator identifying the malfunctioning component.

Other implementations, embodiments or variations will be apparent to those of ordinary skill from reading the present disclosure.

DESCRIPTION OF DRAWINGS

The accompanying drawings, which are incorporated in and constitute a part of this specification, illustrate embodiments of the present teachings and together with the description, serve to explain the principles of the present teachings. In the drawings.

DETAILED DESCRIPTION

Figure 1:
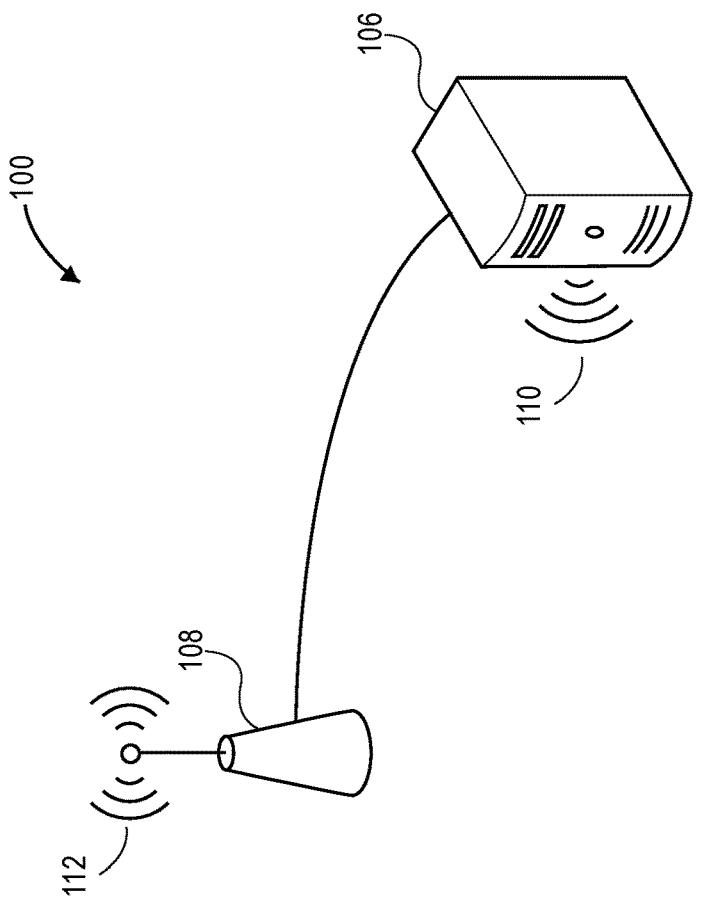
FIG. 1 is a diagram illustrating an example of a system for monitoring a transport system with a monitoring device that travels within the delivery system, consistent with embodiments described herein.
Figure 1:
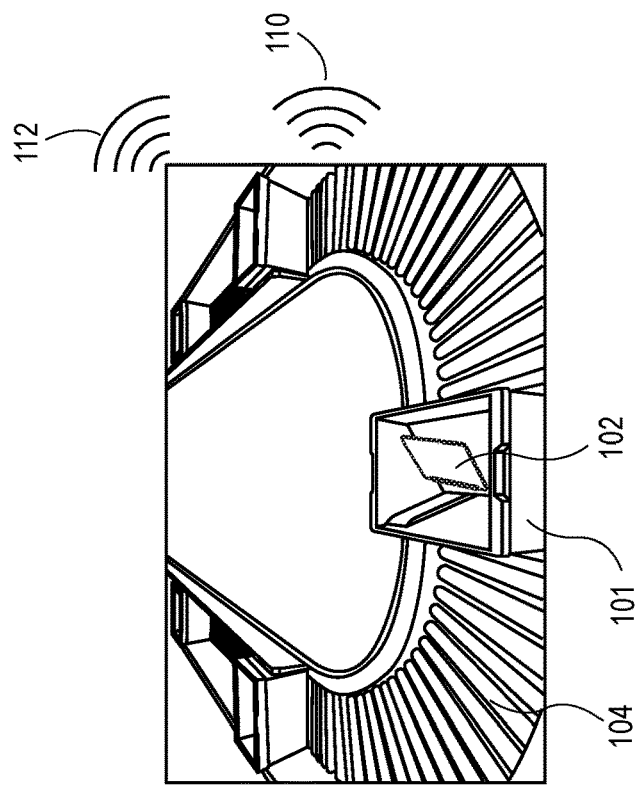

Reference will now be made in detail to the present examples of embodiments of the disclosure, several examples of which are illustrated in the accompanying drawings.

Various embodiments include systems, methods, devices, and manufactures that include and/or utilize monitoring devices. The monitoring devices, as referred to herein, can include any suitable device that collects sensor data as the device is transported through a transport system. In various implementations, the monitoring device may be attached to, or configured to simulate, a container or the like of the type that is typically moved, routed, and/or handled by the transport system. One example of such an implementation is a plastic box or tote that has a monitoring device attached to it, such as Rigid Captive Tray (RCT as used by the U.S. Postal Service in its mail sorting facilities) having a monitoring device as described herein attached to it.

In some embodiments, the transport system can include any suitable number of conveyor belts, lift devices, push devices, and the like. In some examples, the transport system can be configured to sort and process containers. As used herein, a container (e.g., an RCT) can be any type of object that can be used to enclose one or more items, including, among other things, delivery items such as letters, magazines, parcels, etc. In some examples described herein, the container may be box-like or cuboid structure composed of plastic, metal, cardboard (e.g., a cardboard box), or any other suitable material, and may or may not have an open top. As used herein, "cardboard" can refer to any type of heavy paper or paper-like material, such as card stock, corrugated fiberboard, pasteboard, or paperboard. However, in further embodiments, the principles and features described herein can be used with containers composed of other materials, such as fabric, wood, light-weight paper, composites, etc. In some embodiments, the monitoring device is encapsulated in, mounted on, or integrated with a container that is placed into and handled by the transport system to gather and process sensor data in order to monitor the transport system, including in real-time. In some examples, the transport system is a flat sequencing system (e.g., as used by the U.S. Postal Service and the like) that can transport any number of containers that include envelopes, magazines, catalogs, and the like.

As further described herein, the monitoring device can include, for example, one or more microphones, one or more of a depth-sensing device (e.g., depth camera, among others), an accelerometer, a gyroscope, a compass, a global positioning system (GPS) sensor, an indoor positioning system sensor, electrical wires, a battery, a microcontroller, an amplifier, a display, any number of push-button switches, and a wireless transceiver, etc. In some embodiments, the monitoring device can be transported throughout the transport system, which enables the monitoring device to collect sensor data corresponding to various components of the transport system. The monitoring device can analyze the sensor data and determine if any components have maintenance issues to be corrected.

The monitoring device can provide various technical advantages over prior delivery systems. For example, the monitoring device can detect malfunctioning components of a transport system in real-time or near real-time based on sensor data. The monitoring device can also collect sensor data corresponding to various components of a transport system and transmit the sensor data to a control system. The control system can aggregate sensor data from various different transport systems to identify acceptable operating conditions for the various components. In some embodiments, the control system can monitor transport systems in different geographic locations and determine acceptable operating conditions according to local environmental conditions such as humidity, temperature, altitude, and the like. The techniques described herein can also reduce the time period for performing maintenance.

In various implementations, the monitoring device can be used in any type of container transport system, including delivery item sorting systems employed by any type of delivery service, such as the U.S. Postal Service (U.S.P.S.), the FedEx™ company, or the UPS™ company. Furthermore, the monitoring device can monitor and manage the delivery of packages within airports, industrial facilities, and the like.

FIG. 1 is a diagram illustrating an example of a system for monitoring a transport system with a monitoring device that travels within the transport system, consistent with embodiments disclosed herein. As shown in FIG. 1, the system 100 can include a container 101 that includes a monitoring device 102, a transport system 104, and a control system 106. The monitoring device 102 can be attached to the container 101, or integrated into the container 101, and the like. In some examples, the monitoring device 102 is configured as a typical container that is handled by the transport system 104. The transport system 104 can include any suitable conveyor system, such as a line shaft roller conveyor, or a belt conveyor, among others. The transport system 104 can also include various devices to enable the transportation of containers along the conveyor system, such as lift devices, decline conveyors, push devices, and the like. In some examples, the lift devices of a transport system 104 can include any number of rollers at any suitable incline angle that can transport a container to a higher segment of the transport system 104. In some examples, a push device can include any suitable device that can apply pressure to a container to force the container onto a different segment of a transport system 104, such as a different conveyor belt, among others.

The monitoring device 102 can include a processor, a memory device, and a wireless network interface card, among others. In some embodiments, the monitoring device 102 can also include any number of sensors such as accelerometers, humidity sensors, gyroscopes, microphones, cameras, digital or analog scales, and the like. In some examples, the monitoring device 102 can be transported through the transport system 104. For example, the monitoring device 102 can be placed in a container used to sort and process delivery items or goods. As the monitoring device 102 is transported through various components of the transport system 104, the monitoring device 102 can collect sensor data and transmit the sensor data to the control system 106 for further analysis. As discussed in greater detail below, the monitoring device 102 can also perform local analysis based on the sensor data to reduce the amount of sensor data returned to the control system 106.

The monitoring device 102, as depicted in FIG. 1, can be encapsulated in any suitable container, according to the various embodiments. The monitoring device 102 can include a wireless transceiver (not shown in FIG. 1) for communicating with the control system 106. In some embodiments, the wireless transceiver can be a wireless transmitter that transmits signals that can be received by the control system 106. In other embodiments, the wireless transceiver may be able to transmit signals to and receive signals from the control system 106. In some embodiments, the monitoring device 102 can include a display for displaying container information, such as speed, temperature, humidity, etc., as described in further detail below. In some embodiments, the monitoring device 102 can include controls, such as push-button switches, that can be used to, for example, switch between displays of different types of sensor data, switch between different measurement units (e.g., grams, pounds, Celsius, Fahrenheit, etc.), and indicate if a component of the transport system is malfunctioning, etc.

In various implementations, the control system 106 can be any type of one or more computing devices. For example, the control system 106 can be a portable computing device, such as a smartphone, or a tablet computer, etc. As a further example, the control system 106 can be a desktop computer, a server, a database, or any type of IoT device, etc. In various implementations, the control system 106 can execute an application or program that causes the control system 106 to perform some or all of the functions described in this disclosure. In some implementations, the application or program may be provided by or downloadable from a delivery service, such as the U.S.P.S. Additionally, in another example implementation, the control system 106 can be programmed to act as a conduit in order to retrieve information from a monitoring device 102 in a local facility or a monitoring device 102 in a remote facility.

In some embodiments, the control system 106 can be any type of one or more computing devices capable of communicating with the monitoring device 102 and/or an access point 108 via wired and/or wireless signals in one or more wired and/or wireless networks (e.g., the Internet). In some embodiments, the control system 106 can be controlled by the delivery service that operates the transport system 104, and the control system 106 can receive or obtain and maintain a database of sensor data collected from multiple monitoring devices 102. The sensor data can include a current location of the monitoring devices 102 at a particular time, a temperature of the monitoring devices 102, a speed of the monitoring devices 102, any vibrations detected by the monitoring devices 102, a change in velocity of the monitoring devices 102, an indication of malfunctioning components of the transport system 104, and whether an accelerator has been triggered, etc.

The monitoring device 102 can communicate with the control system 106 via the wireless signal link 110. As described herein, a wireless signal can be any type of analog or digital wireless signal, such as a Bluetooth™ signal, a 3G signal, a 4G signal, a 5G signal, a radio signal, a Wi-Fi signal, and the like. In various embodiments, the monitoring device 102 can communicate with the control system 106 through a wide-area network, such as the Internet. For example, the control system 106 can receive, from the monitoring device 102, sensor data and/or indicators corresponding to the transport system 104. In some embodiments, the indicators can correspond to components of a transport system 104 based on sensor data analyzed by the monitoring device 102. For example, the indicators can include identifiers of malfunctioning components, and the like. In some embodiments, the various indicators can be generated based on any combination of sensor data collected by the sensors of the monitoring device 102.

In some embodiments, the control system 106 and/or the monitoring device 102 can include a display, and the display can be used to display information detected by sensors within the monitoring device 102. The information can be detected by the monitoring device 102 using the features and sensors described in further detail below.

As noted above, in some implementations, the monitoring device 102 can execute software that collects and analyzes sensor data. In some examples, the monitoring device 102 can transmit the results from the analysis of the sensor data, along with the sensor data, to the control system 106. To minimize bandwidth usage between the monitoring device 102 and the control system 106, the monitoring device 102 can identify a subset of the sensor data to transmit to the control system 106, or the monitoring device 102 can process the sensor data and send results indicating malfunctioning components of a transport system.

In some embodiments, the monitoring device 102 can transmit sensor data and/or results from analysis of the sensor data to an access point 108, which can be any type of one or more devices capable of receiving and/or sending wireless signals and communicating with the control system 106. For example, the access point 108 can be a standalone device connected to a network router in a wired network or can be a device that is integrated with a network router.

In some examples, the access point 108 can communicate with the monitoring device 102 via the wireless signal link 112 to or from the monitoring device 102. Additionally, the access point 108 can communicate with the control system 106 via wired and/or wireless signals in one or more wired and/or wireless networks (e.g., the Internet) (not shown in FIG. 1). Accordingly, the monitoring device 102 can transmit sensor data and other information related to a transport system 104 to the control system 106 via the wireless signal link 110 and/or the access point 108 via the wireless signal link 112.

In an example use of the system 100, the monitoring device 102 can be placed on any suitable conveyor belt, or other component of the transport system 104. The monitoring device 102 can travel through the transport system 104 and collect sensor data indicating a speed of the monitoring device 102, a vibration of the monitoring device 102, any sounds detected by the monitoring device 102, and images or video captured by cameras of the monitoring device 102, among others. In some embodiments, the monitoring device 102 can analyze the sensor data corresponding to each component of the transport system 104. The monitoring device 102 can transmit an indication of a malfunctioning component of the transport system 104 to the access point 108 and/or the control system 106. The monitoring device 102 can also determine whether to send sensor data corresponding to the malfunctioning component of the transport system 104 to the access point 108 and/or the control system 106. As discussed in greater detail below in relation to FIG. 2, the sensor data detected or obtained by the monitoring device 102 can include, for example, the speed of the monitoring device 102, indoor positioning system coordinates of the monitoring device 102, a temperature proximate of the monitoring device 102, a humidity measurement corresponding to a location of the monitoring device 102, an indication of whether an accelerometer has been triggered (e.g., exceeded a predetermined threshold for an acceleration amount), etc. In some embodiments, the control system 106 can store the sensor data in a database.

The system 100 is an example of a system that can be used with disclosed embodiments, and is not intended to be limiting. In various embodiments, additional devices or fewer devices and/or functions can be included in the system and the devices can communicate via one or more networks. For example, the system 100 can include multiple containers, multiple access points, multiple control systems, and other devices (e.g., databases, servers, sensors, etc.).

Figure 2:
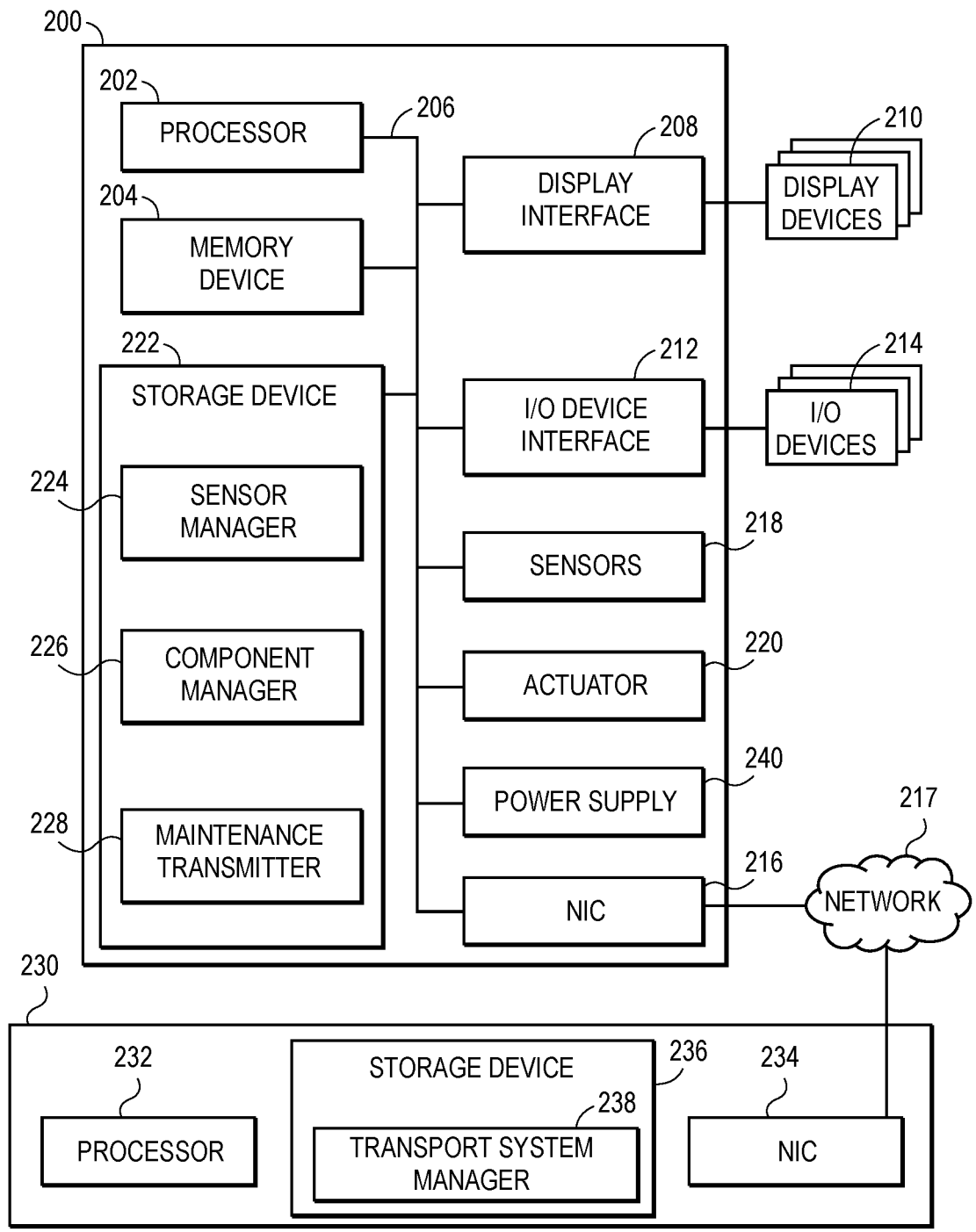
FIG. 2 is a diagram illustrating a block diagram of an example monitoring device and a control system, consistent with embodiments described herein.

FIG. 2 is a diagram illustrating an example of a monitoring device, consistent with an embodiment of the invention. As discussed in greater detail below, the monitoring device 200 can collect and process data corresponding to transport systems (not depicted). In some embodiments, the monitoring device 200 can include a processor 202 that is configured to execute stored instructions, as well as a memory device 204 that stores instructions that are executable by the processor 202. The processor 202 can be a single core processor, or a multi-core processor, among others. The memory device 204 can include random access memory, read only memory, flash memory, or any other memory systems. The instructions that are executed by the processor 202 can implement the method 300 that collects and processes data related to transport systems as described below in relation to FIG. 3.

The processor 202 can also be linked through a system interconnect 206 (e.g. PCI®, PCI-Express®, etc.) to a display interface 208 configured to connect the monitoring device 200 to a display device 210. The display device 210 can include a built-in display screen or an externally connected display screen such as a computer monitor, television, and the like.

Additionally, the processor 202 can be connected through the system interconnect 206 to an input/output (I/O) device interface 212 configured to connect the monitoring device 200 to one or more I/O devices 214. The I/O devices 214 can include, for example, a keyboard, a mouse, a touchpad, and the like. The I/O devices 214 can be built-in components of the monitoring device 200 or the I/O devices 214 can be externally connected to the monitoring device 200.

In some embodiments, the processor 202 can be linked through the system interconnect 206 to a network interface controller (also referred to as a "NIC") 216 that is configured to connect the monitoring device 200 through the NIC 216 to a network 217. The network 217 may be a cellular network, a radio network, a wide area network (WAN), a local area network (LAN), or the Internet, among others.

In some embodiments, the processor 202 can also be linked through the system interconnect 206 to any suitable number of sensors 218, and an actuator 220, among others.

The sensors 218 can include a speed sensor, a distance sensor, a tilt sensor, an acceleration sensor, a temperature sensor, a humidity sensor, a vibration sensor, a location sensor, a sound sensor, and the like. In some embodiments, the sensors 218 can also include a digital camera, and a microphone. The actuator 220 can be used as a sensor cleaning device using air or a brush.

In some embodiments, the monitoring device 200 can have a modular design that enables changing the sensors 218 coupled to the monitoring device 200. For example, the monitoring device 200 can include a modular design that enables any number of sensors 218 to attach to an external portion of the monitoring device 200. The sensors 218 can share a common interface, such as a universal serial bus (USB) interface, among others. The common interface can enable changing the sensors 218 coupled to the monitoring device 200 such as an accelerometer to be replaced with a compass or an indoor positioning system sensor, or any other sensor.

In some embodiments, the processor 202 can also be linked through the system interconnect 206 to a storage device 222 that can include a hard drive, an optical drive, a USB flash drive, a solid state drive, or any combination thereof. In some examples, the storage device 222 can include any suitable number of applications and stored data that enable the monitoring device 200 to collect and process data related to transport systems. For example, the storage device 222 can include a sensor manager 224, a component manager 226, and a maintenance transmitter 228. The sensor manager 224 can detect, receive, collect, or otherwise obtain sensor data from any number of sensors 218. In some examples, the sensor data is collected in transit along a conveyor device of a transport system such as a flat sequencing system. The flat sequencing system can be a transport system that includes any number of conveyor devices that transport magazines, envelopes, catalogs, and the like.

In some embodiments, the component manager 224 can detect, recognize, or deduce a malfunctioning component in the transport system based on the sensor data. For example, the component manager 224 can compare sensor data gotten or obtained from the sensor 218 to predetermined "normal" ranges of sensor data (e.g., a range that indicates that a component is correctly functioning) to detect malfunctioning/maintenance issues for components of a transport system. A malfunctioning component can include a conveyor belt moving too fast or too slow, a push device applying too much pressure or not enough pressure to containers transported within the transport system, a pulley causing vibrations along a conveyer belt, and the like.

In some embodiments, the maintenance transmitter 228 can transmit a maintenance indicator to a control system 230 of the transport system. In some examples, the maintenance indicator corresponds to the malfunctioning component. For example, the maintenance indicator can provide a time or a time range to replace or repair the malfunctioning component of the transport system. The maintenance indicator can prioritize repairs to malfunctioning components corresponding to sensor data farther beyond a predetermined range of sensor data values than other malfunctioning components. For example, the system 200 may determine or detect that an idler pulley is malfunctioning in a minor manner based on sensor data that shows or records a vibration that is slightly above (e.g., up to 10% above) a predetermined maximum vibration value contained in a stored range of operating conditions for pulleys. The system 200 may also may also detect or determine that a push device is malfunctioning in a major manner based on sensor data indicating that it is operating at twice maximum speed stored in the predetermined range of operating conditions for push devices. In some embodiments, the maintenance transmitter 228 can indicate to prioritize repair of the push device before the idler pulley based on the degree of malfunction relative to the predetermined range of normal operating conditions. The maintenance transmitter 228 can also indicate if the push device is in need of immediate repair or if the repair can be scheduled for a later time or date, again according to the degree of malfunction relative to the predetermined range of normal operating conditions.

In some examples, the maintenance transmitter 228 can transmit the maintenance indicator as well as any sensor data to the control system 230 via any suitable interface, such as the NIC 216. The maintenance transmitter 228 may identify a subset of sensor data to transmit to the control system 230 to avoid bandwidth issues and latency. For example, the maintenance transmitter 228 may transmit sensor data for a predetermined period of time as the monitoring device 200 is transported proximate to the malfunctioning component. In some examples, the maintenance transmitter 228 can select any suitable time period for the sensor data that is transmitted. In some examples, the maintenance transmitter 228 may not transmit sensor data corresponding to functioning components of the transport system.

In some embodiments, the control system 230 can be any suitable server, desktop computer, laptop computer, tablet device, and the like. The control system 230 can also include a processor 232, a NIC 234, and a storage device 236, among others. In some embodiments, the storage device 236 can include a transport system manager 238 that can detect and store the maintenance indicators and sensor data received from the monitoring device 200. In some examples, the transport system manager 238 can also aggregate maintenance indicators and sensor data received from multiple monitoring devices in one or more facilities. The transport system manager 238 can revise a predetermined range of sensor data corresponding to expected operating conditions based on the maintenance indicators and sensor data. For example, the transport system manager 238 can determine if the predetermined range of sensor data can be adjusted to enable less frequent maintenance for some components. For example, low humidity can cause static discharge and high humidity can cause condensation. The transport system manager 238 can monitor multiple different transport systems operating with different humidity levels and determine a suitable humidity range for the facilities that host the transport systems. The transport system manager 238 can also detect or determine that sensor data is outside of the revised or updated predetermined range and schedule maintenance for components of the transport system corresponding to the sensor data.

Returning to the monitoring device 200, in some embodiments, the monitoring device 200 can also include a power supply 240. The power supply 240 can receive power for the monitoring device 200 from any suitable source using a dynamo charge, a flash charge, an inductive charge, or a plug-in charging station, among others.

It is to be understood that the block diagram of FIG. 2 is not intended to indicate that the monitoring device 200 or the control system 230 are to include all of the components shown in FIG. 2. Rather, the monitoring device and the control system 230 can include fewer or additional components not illustrated in FIG. 2. Additionally, the sensor manager 224, the component manager 226, and the maintenance transmitter 228 can be partially, or entirely, implemented in hardware and/or in the processor 202. In some examples, the functionalities of the sensor manager 224, the component manager 226, and the maintenance transmitter 228 can be implemented with logic that can include any suitable hardware, software, firmware, or any combination of hardware, software, and firmware. Moreover, the functionalities of the transport system manager 238 can also be implemented with logic that can include any suitable hardware (e.g. processor 232), software, firmware, or any combination of hardware, software, and firmware.

Figure 3:
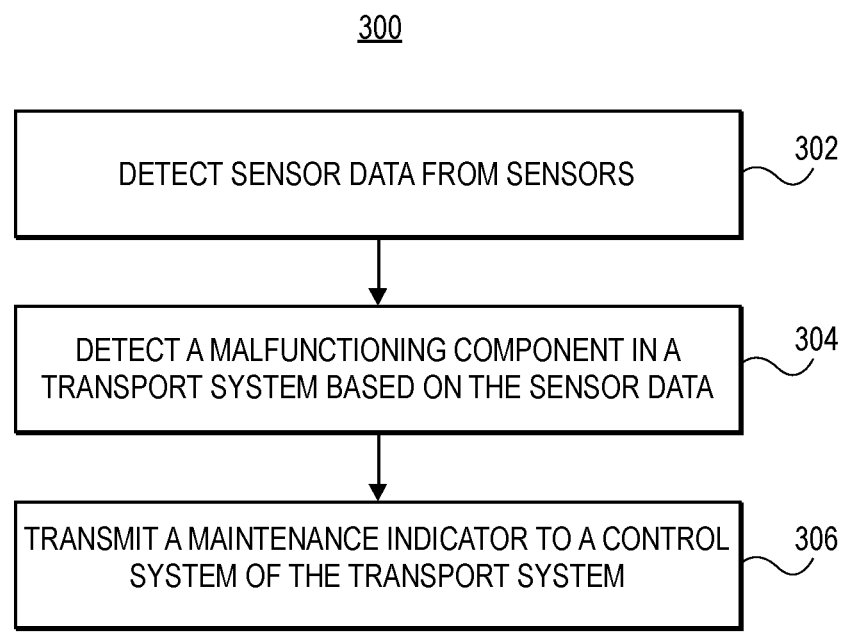
FIG. 3 is a process flow diagram of an example of a method for processing sensor data from a monitoring device in a transport system, consistent with embodiments described herein.

FIG. 3 is a process flow diagram of an example method for monitoring a transport system with a monitoring device. The method 300 can be implemented with any suitable device, such as the monitoring device 102 of FIG. 1, or the monitoring device 200 of FIG. 2, among others.

At block 302, a monitoring device can detect, receive, or obtain sensor data from any number of sensors. For example, the sensors can include an accelerometer, a gyroscope, an indoor positioning system sensor, a humidity sensor, a camera, or a microphone, among others. In some embodiments, the monitoring device can include any combination of different sensors. In some examples, the sensor data is collected from the monitoring device placed inside a container or a rigid captive tray (RCT) that is in transit along a conveyor device of a transport system or flat sequencing system. In some examples, a flat sequencing system can be a transport system that includes any number of conveyor devices that transport magazines, envelopes, catalogs, and the like.

In some embodiments, the monitoring device can be calibrated prior to placing the monitoring device in the transport system. For example, any number of sensors can be calibrated within the monitoring device. The calibration can include verifying that an accelerometer indicates that a stationary monitoring device is not moving, or verifying a location of the monitoring device based on indoor positioning system coordinates, and the like.

At block 304, the monitoring device can identify, recognize, detect a malfunctioning component in the transport system based on the sensor data. For example, the monitoring device can compare sensor data to predetermined ranges of sensor data associated with expected operating conditions to detect maintenance issues for components of a transport system. In some examples, the predetermined ranges of sensor data can be static or dynamic. For example, the monitoring device can store predetermined ranges of sensor data corresponding to expected operating conditions of various components of a transport system. In some embodiments, the monitoring device can update the predetermined ranges of sensor data corresponding to expected operating conditions based on information received from the control system. For example, the updated range of sensor data corresponding to expected operating conditions can be broadened or narrowed for particular sensors. In some examples, the updated range of sensor data can include a smaller range for acceleration values, a larger range for acceleration values, a smaller or larger range for vibration values, a smaller or larger range for pressure or force values, and the like. In some embodiments, the range of sensor data corresponding to expected operating conditions is determined by the control system that aggregates data from multiple facilities. The control system can monitor maintenance operations for components of transport systems in different facilities and determine if the predetermined range of sensor data can be adjusted to enable less frequent maintenance for some components. For example, low humidity can cause static discharge and high humidity can cause condensation. Accordingly, the control system can set a predetermined range of expected operating conditions for a transport system based on a range of humidity in the facility housing the transport system. In some embodiments, the control system can determine that the transport system can operate at different speeds depending on the humidity level. In some examples, the control system can broaden or narrow the range of speed related sensor data corresponding to expected or acceptable operating conditions for the transport system.

Components that are operating outside of a predetermined range of sensor data corresponding to expected operating conditions can be identified as malfunctioning components. In some examples, the malfunctioning components can include a conveyor belt moving too fast or too slow, a push device applying too much pressure or not enough pressure to containers transported within the transport system, a pulley causing vibration of a conveyer belt, and the like. In some examples, the malfunctioning component can also include a malfunctioning conveyor belt, idler pulley, transmission pulley, push device, lift device, decline conveyor device, or camera in the transport system, among others.

Still at block 304, in some embodiments, malfunctioning components can include misaligned conveyor guiderails causing drag, impact, or tray jam conditions. The malfunctioning components can also include damaged or worn conveyor roller O-rings causing motion performance issues. In some examples, the malfunctioning components can result in decline conveyor slip issues causing tray jam conditions. For example, a decline conveyor can be stopped, but a tray or container may continue moving due to the gravitational force overcoming the brake or friction forces. In some embodiments, the malfunctioning component can cause barcode scanner alignment issues. For example, sensors can detect the laser light of the barcode scanner and the system can determine if a scanner needs to be aligned. In some examples, the sensor data can indicate a malfunctioning component that can include a transportation belt welding seam, which can cause excessive vibration when passing the bottom of a stopped tray or container.

In some embodiments, sensor data can enable monitoring a transportation belt coefficient or friction value. For example, the transportation belt can build up a layer of dirt over time causing an increase of friction. The increase in friction causes an increase of pressure onto the stop device and the increased pressure can be monitored based on sensor data.

In some examples, sensor data can also enable lift device shelf alignment monitoring. For example, lift devices with independent shelves can become misaligned over time causing the tray being lifted in a tilted position. The sensor data can indicate when the lift devices are malfunctioning.

In some embodiments, machine learning techniques can be used by the control system and/or the monitoring device to analyze sensor data. For example, the machine learning techniques can identify sounds corresponding to malfunctioning conveyor belts, conveyor pulleys, power transmission belts, and the like. The machine learning techniques can also identify malfunctioning components with missing parts, broken parts, and the like, based on collected images from cameras of the monitoring device.

At block 306, the monitoring device can transmit a maintenance indicator to a control system of the transport system, wherein the maintenance indicator corresponds to the malfunctioning component. For example, the maintenance indicator can identify a malfunctioning component, a location of the malfunctioning component, a time associated with the monitoring device detecting the malfunctioning component, a severity of the maintenance issue affecting the malfunctioning component, and the like. In some examples, the monitoring device can also transmit sensor data to the control system. For example, the monitoring device can store or stream images and/or videos if the monitoring device determines or detects that sensor data is indicating a condition that is outside of a predetermined normal or acceptable range. The monitoring device can transmit the images and/or videos to the control system to enable inspection of components within the transport system that are difficult to visually inspect. In some examples, the sensor data is time stamped with location information based on a zone identifier for the conveyors of a transport system. The zone identifier and location information can include any suitable data obtained or detected by an indoor positioning system, among others. For example, the zone identifier can correspond to a particular conveyor belt, lift device, and the like.

In some embodiments, a monitoring device can transmit the sensor data and/or maintenance indicator in real-time or asynchronously. For example, the monitoring device can transmit information to the control system at predetermined times of the day. In some embodiments, the maintenance indicator can indicate a time to schedule maintenance. For example, the maintenance indicator can predict an amount of time before maintenance is to be performed on a malfunctioning component of a transport system.

In some embodiments, the sensor data and maintenance indicators can be collected and aggregated in a local database for a facility or within a global database including information from multiple facilities. As discussed above, the sensor data can be aggregated based on sensor type and stored within tables of the database to enable identifying acceptable operating conditions of a transport system. Each table can include aggregated sensor data such as accelerometer values, gyroscope values, location values, speed values, temperature values, and the like. In some embodiments, any number of values can be aggregated from multiple facilities housing transport systems.

It is to be understood that the process flow of FIG. 3 can include any number of additional blocks or any number of fewer blocks. Furthermore, the blocks of FIG. 3 can be performed in any suitable order. In some embodiments, the method 300 can include placing multiple monitoring devices in a transport system. The multiple monitoring devices can communicate with each other to enable the local processing of sensor data. For example, the multiple monitoring devices can share acceleration values, locations, and the like, which can enable a monitoring device to determine a change in the transport system. In some examples, the change in the transport system can be a conveyor belt operating a different speed, a lift device operating at a different speed, or a push device operating at a different speed and/or pressure, among others. The monitoring devices can determine if the change in the operation of a component of a transport system indicates that the component is malfunctioning as discussed above in relation to blocks 304 and 306.

Figure 4:
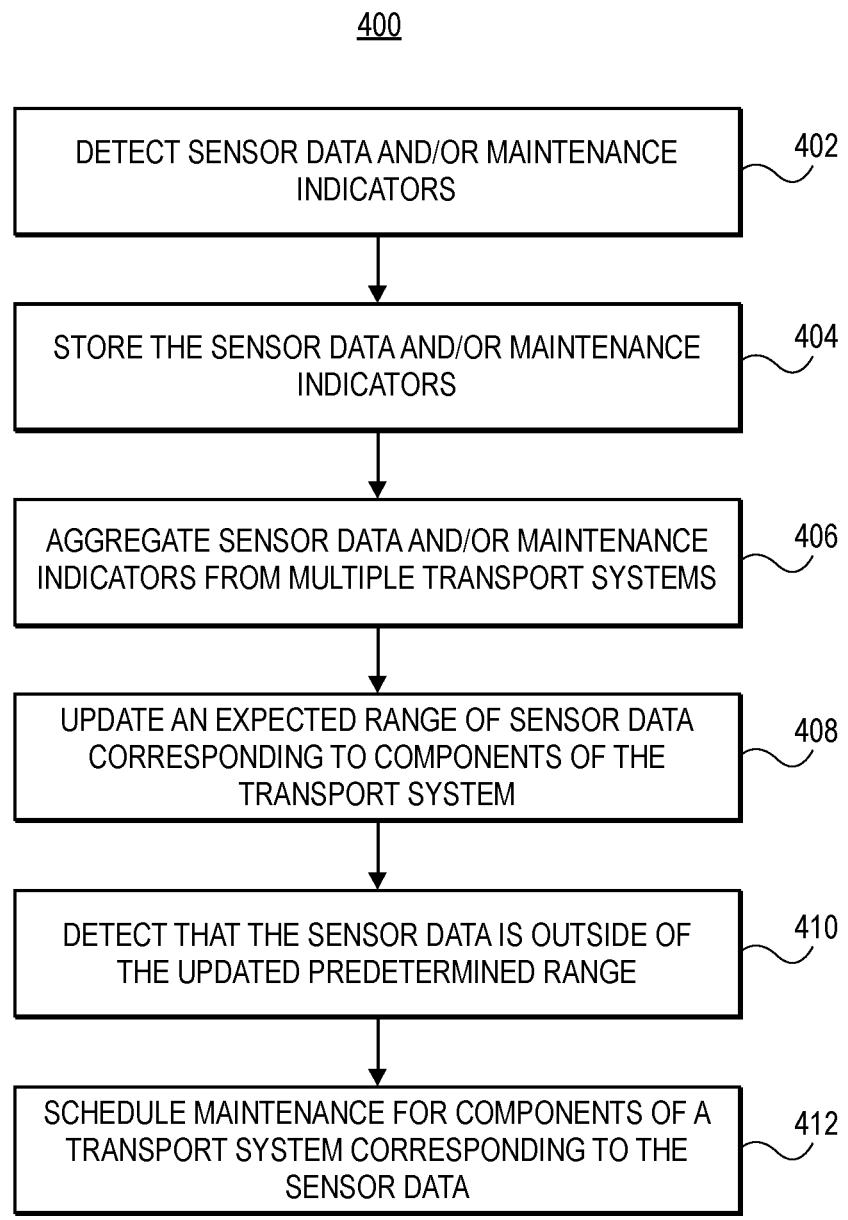
FIG. 4 is a process flow diagram of an example of a method for analyzing collected sensor data related to a transport system, consistent with embodiments described herein.

FIG. 4 is a process flow diagram for an example method of analyzing sensor data with a control system. The method 400 can be implemented with any suitable computing device such as the control system 106 of FIG. 1, or the control system 230 of FIG. 2, among others.

At block 402, the control system can receive, detect, or otherwise obtain sensor data and/or maintenance indicators from one or more monitoring devices. In some embodiments, the control system can receive or detect the sensor data and/or maintenance indicators from the monitoring devices via any suitable wireless communication, such as a Bluetooth communication, a WiFi communication, a cellular based communication, and the like.

At block 404, the control system can store the sensor data and/or maintenance indicators in a database, which may be a local database or a remote database. For example, the local database can reside within a memory device coupled to the control system, while the remote database can reside within a memory device coupled to a remote server at a separate location from the control system. In some embodiments, the control system can store the sensor data and maintenance indicators for each monitoring device in a single table of a database, or each table of the database can correspond to sensor data from separate sensors coupled to the monitoring device. For example, a first table of a database can store a location of a monitoring device based on an indoor location sensor along with a timestamp, and a second table of the database can store a speed of the monitoring device based on sensor data from an accelerometer, among others.

At block 406, the control system can aggregate sensor data and/or maintenance indicators from multiple transport systems. For example, the control system can aggregate sensor data from accelerometers, gyroscopes, and any other suitable sensors of a shared sensor type. In some examples, the control system can store the aggregated sensor data in separate database tables based on the sensor type such that accelerometer sensor data is stored in a first database table, gyroscope sensor data is stored in a second database table, and the like. The control system can analyze the aggregated sensor data from multiple transport systems as discussed in greater detail below in relation to block 408.

At block 408, the control system can update an expected range for sensor data corresponding to components of the transport system. For example, the control system can determine that a transport system can operate at a faster or slower speed, can apply a greater force on containers, can operate within different humidity levels, and the like. In some embodiments, the control system can monitor maintenance requests for components and compare the maintenance requests to the aggregated sensor data from multiple transport systems. The control system can determine that maintenance requests correspond to a particular speed of a conveyor belt, a force applied by a push device in the transport system, or a speed at which a lifter device in the transport system functions. The control system can update or modify a predetermined range of sensor data for components of the transport system based on the maintenance requests, among other data.

In some embodiments, the control system can update the expected range for sensor data based on local environmental conditions such as humidity, temperature, and altitude, among others. For example, the control system can determine a speed at which the transport system can operate in different environmental conditions, which reduces a number of malfunctioning components.

At block 410, the control system can detect or determine that the sensor data is outside of the updated predetermined range. For example, the control system can detect that components of a transport system are operating outside of the revised range of sensor data. In some embodiments, the control system can initiate a maintenance request in response to a sensed speed of a monitoring device exceeding an upper threshold value based on accelerometer sensor data, among others.

At block 412, the control system can schedule maintenance for components of a transport system corresponding to the sensor data. In some embodiments, the control system can also schedule maintenance requests for a transport system based on operating conditions of the transport system or based on a detected malfunctioning component. For example, the control system can schedule more frequent periods of maintenance for transport systems operating at high temperatures or low temperatures, operating at high speeds, and the like.

It is to be understood that the process flow of FIG. 4 can include any number of additional blocks or any number of fewer blocks. Furthermore, the blocks of FIG. 4 can be performed in any suitable order.

Figure 5:
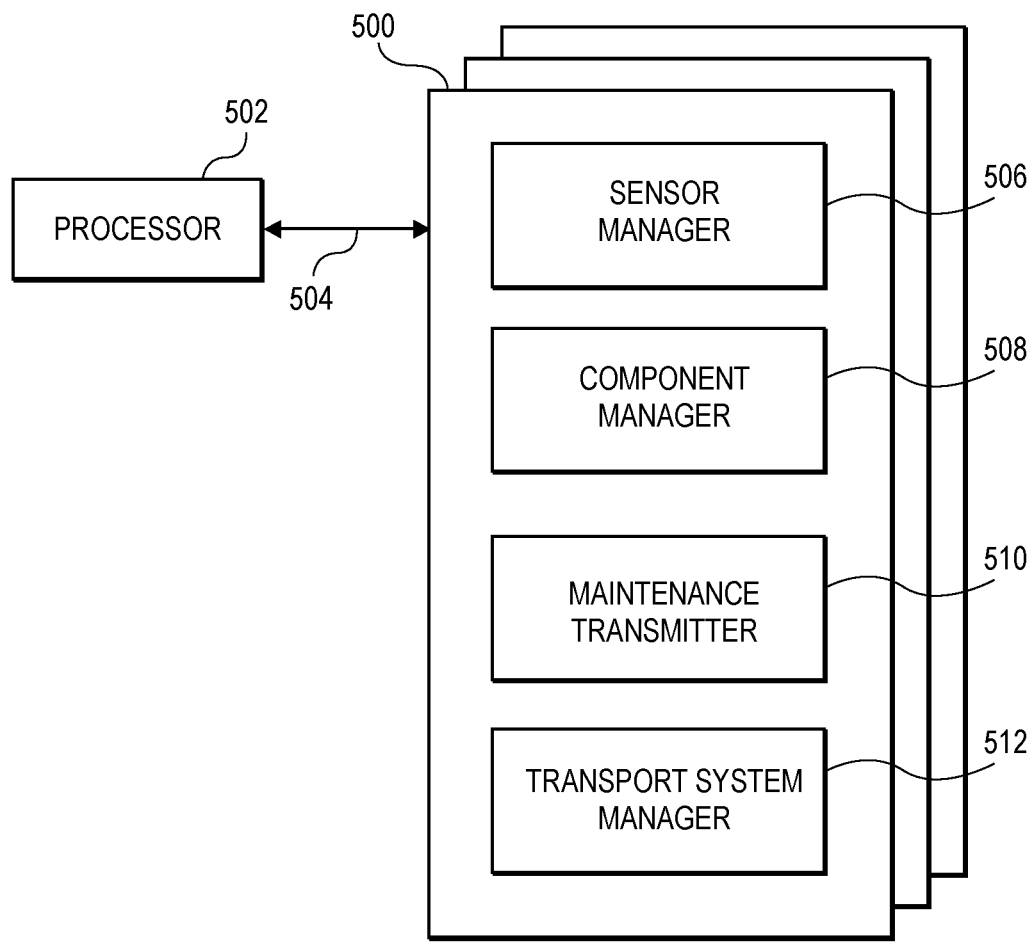
FIG. 5 is an example of a tangible, non-transitory computer-readable medium for monitoring a transport system, consistent with embodiments described herein.

FIG. 5 illustrates a block diagram of a non-transitory computer-readable medium for monitoring a transport system. The tangible, non-transitory computer-readable medium 500 can be accessed by a processor 502 over any suitable system interconnect or system interface 504. Furthermore, the tangible, non-transitory computer-readable medium 500 can include code that directs the processor 502 to perform the operations of the various embodiments described above in relation to FIGS. 1-4.

The software components described above can be stored on the tangible, non-transitory computer-readable medium 500, as indicated in FIG. 5. In some embodiments, the tangible, non-transitory computer-readable medium 500 can include a sensor manager 506 that can receive, detect, or obtain sensor data from any number of sensors, wherein the sensor data correspond to components of a transport system such as a flat sequencing system. In some embodiments, the tangible, non-transitory computer-readable medium 500 can also include a component manager 508 that can recognize, determine, or detect a malfunctioning component in the transport system based on the sensor data. For example, the component manager 508 can compare sensor data from the sensors to predetermined acceptable range(s) for that type of sensor data and recognize or detect malfunction and/or maintenance issues for components of a transport system when the sensor data falls outside of the acceptable range(s), including, in some embodiments, the degree or magnitude to which the sensor data falls outside of the acceptable range(s). In some examples, the tangible, non-transitory computer-readable medium 500 can further include a maintenance transmitter 510 that can transmit a maintenance indicator to a control system of the transport system or flat sequencing system. In some examples, the maintenance indicator corresponds to the malfunctioning component and indicates a time to perform the maintenance, and the like.

In some embodiments, the tangible, non-transitory computer-readable medium 500 can also include a transport system manager 512 that can detect, process, and store the maintenance indicators and sensor data received from a monitoring device. In some examples, the transport system manager 512 can also aggregate maintenance indicators and sensor data received from multiple monitoring devices in one or more facilities. The transport system manager 512 can revise a predetermined range of sensor data based on the maintenance indicators and sensor data. The transport system manager 512 can also recognize or detect sensor data that is outside of the revised or updated predetermined range and schedule maintenance for components of the transport system corresponding to the sensor data.

It is to be understood that any suitable number of software components shown in FIG. 5 can be included within the tangible, non-transitory computer-readable medium 500.

While the teachings have been described with reference to the examples of embodiments, those skilled in the art will be able to make various modifications to the described embodiments without departing from the true spirit and scope. The terms and descriptions used herein are set forth by way of illustration only and are not meant as limitations. In particular, although the method has been described in a specific order of steps, the steps of the method may be performed in a different order than illustrated, or may be performed simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A monitoring device comprising:
   one or more sensors; and
   a processor, operably connected to the one or more sensors, configured to execute computer-readable instructions that cause the processor to perform operations comprising:
      obtaining sensor data from the one or more sensors, the sensor data collected as the monitoring device is transported through a transport system for delivery items;
      detecting a malfunctioning component of the transport system based on the sensor data;
      transmitting a maintenance indicator to a control system of the transport system, the maintenance indicator identifying the malfunctioning component; and
      transmitting at least a portion of the sensor data to the control system for further analysis by the control system,
      wherein the monitoring device is attached to, or configured to simulate, a container of a type that is typically moved, routed, or handled by the transport system; and
      wherein the malfunctioning component is not the container.

2. The monitoring device of claim 1, wherein the one or more sensors comprise at least one of an accelerometer, a gyroscope, a humidity sensor, a temperature sensor, or a location sensor.

3. The monitoring device of claim 1, wherein the monitoring device comprises an actuator and a camera, and wherein the operations comprise activating the actuator to remove debris from the camera.

4. The monitoring device of claim 1, wherein detecting the malfunctioning component in the transport system based on the sensor data comprises detecting a malfunction in one or more of: a lift device, a decline conveyor device, or a push device of the transport system.

5. The monitoring device of claim 1, wherein the control system comprises a second processor that is configured to perform operations comprising:
   obtaining a predetermined normal range of sensor data corresponding to expected operating conditions for each of the one or more sensors;
   modifying the predetermined normal range of sensor data corresponding to the expected operating conditions based on the maintenance indicator; and
   detecting subsequent malfunctioning components based on the modified predetermined normal range of sensor data.

6. The monitoring device of claim 5, wherein the second processor is configured to perform operations comprising:
   obtaining a plurality of maintenance indicators from two or more transport systems; and
   aggregating the plurality of maintenance indicators from the two or more transport systems.

7. The monitoring device of claim 6, wherein aggregating the plurality of maintenance indicators comprises aggregating the plurality of maintenance indicators based on a shared type of the one or more sensors corresponding to the maintenance indicators.

8. The monitoring device of claim 5, wherein the second processor is configured to perform operations comprising prioritizing repairs to the subsequent malfunctioning components based on the modified predetermined normal range of sensor data.

9. The monitoring device of claim 1, wherein detecting the malfunctioning component in the transport system based on the sensor data comprises detecting a malfunction in one or more of: a conveyor belt, an idler pulley, and a transmission pulley.

10. The monitoring device of claim 1, wherein the one or more sensors comprises a camera; and
    wherein detecting the malfunctioning component in the transport system based on the sensor data comprises identifying the malfunctioning component using machine learning techniques applied to at least one image of the malfunctioning component, wherein the at least one image is captured by the camera.

11. The monitoring device of claim 1, wherein the maintenance indicator comprises a time or a time range at which to replace or repair the malfunctioning component of the transport system.

12. The monitoring device of claim 1, wherein the container is a tote box.

13. A computer-implemented method for monitoring a transport system for delivery items, the method comprising:
    obtaining sensor data from one or more sensors of a monitoring device, the sensor data collected as the monitoring device is transported through the transport system for delivery items;
    detecting a malfunctioning component of the transport system based on the sensor data;
    transmitting a maintenance indicator to a control system of the transport system, the maintenance indicator identifying the malfunctioning component; and
    transmitting at least a portion of the sensor data to the control system for further analysis by the control system,
    wherein the monitoring device is attached to, or configured to, simulate a container of a type that is typically moved, routed, or handled by the transport system; and
    wherein the malfunctioning component is not the container.

14. The computer-implemented method of claim 13, wherein the one or more sensors comprise at least one of an accelerometer, a gyroscope, a humidity sensor, a temperature sensor, or a location sensor.

15. The computer-implemented method of claim 13, wherein the one or more sensors comprises a camera that is operably coupled to an actuator, and wherein the method further comprises activating the actuator to remove debris from the camera.

16. The computer-implemented method of claim 13, wherein detecting the malfunctioning component in the transport system based on the sensor data comprises detecting a malfunction in one or more of: a lift device, a decline conveyor device, or a push device of the transport system.

17. The computer-implemented method of claim 13, comprising:

obtaining, by a control system, a predetermined normal range of sensor data corresponding to expected operating conditions for each of the one or more sensors;

modifying, by the control system, the predetermined normal range of sensor data corresponding to the expected operating conditions based on the maintenance indicator; and detecting, by the control system, subsequent malfunctioning components based on the modified predetermined normal range of sensor data.

18. The computer-implemented method of claim 13, wherein the container is a tote box.

19. A non-transitory computer-readable medium for processing sensor data for a transport system for delivery items, the medium comprising instructions that when executed by a processor of a monitoring device cause the processor to perform operations comprising:

obtaining sensor data from one or more sensors, the sensor data collected as the monitoring device is transported through the transport system for delivery items;

detecting a malfunctioning component of the transport system based on the sensor data;

transmitting a maintenance indicator to a control system of the transport system, the maintenance indicator identifying the malfunctioning component; and transmitting at least a portion of the sensor data to the control system for further analysis by the control system, wherein the monitoring device is attached to, or configured to, simulate a container of a type that is typically moved, routed, or handled by the transport system; and wherein the malfunctioning component is not the container.

20. The non-transitory computer-readable medium of claim 19, wherein the medium further comprises other instructions that when executed by a processor of a control system cause the processor of the control system to perform operations comprising:

obtaining a predetermined normal range of sensor data corresponding to expected operating conditions for each of the one or more sensors;

modifying the predetermined normal range of sensor data corresponding to the expected operating conditions based on the maintenance indicator; and detecting subsequent malfunctioning components based on the modified predetermined normal range of sensor data.

* * * * *